Figure 2A:
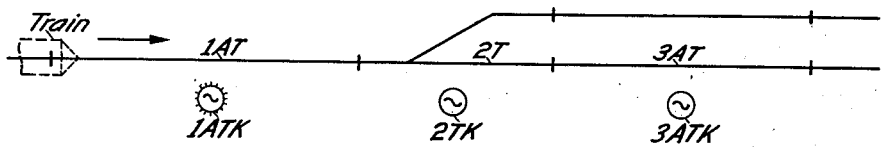

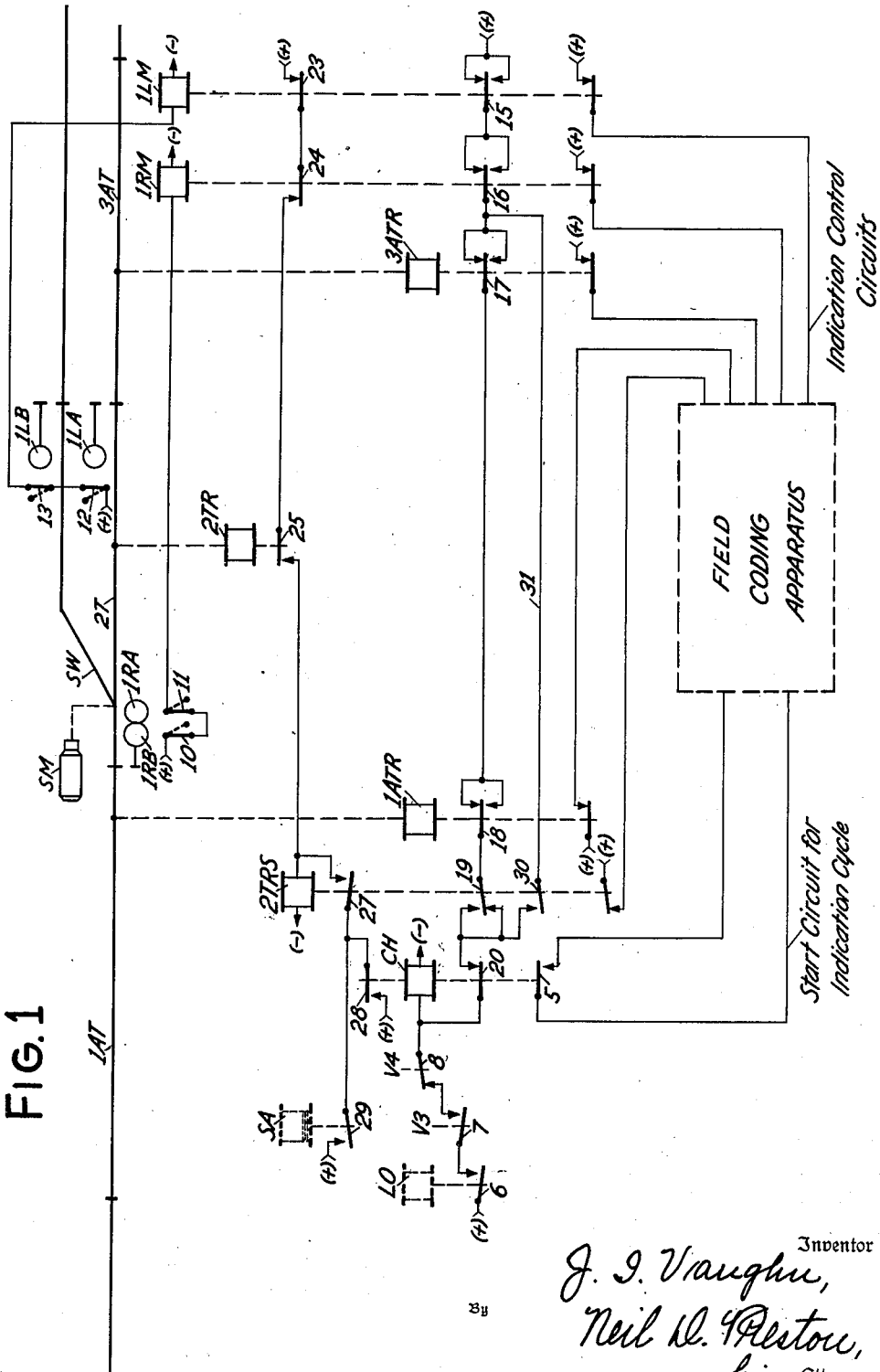
May 2, 1950
J. I. VAUGHN
2,506,527
AUTOMATIC FIELD START CONTROL FOR CODE
TYPE COMMUNICATION SYSTEMS
Filed May 26, 1945
2 Sheets-Sheet 1
Inventor
J. I. Vaughn,
Neil D. Preston,
his Attorney May 2, 1950  
J. I. VAUGHN  
AUTOMATIC FIELD START CONTROL FOR CODE TYPE COMMUNICATION SYSTEMS  
2,506,527

Filed May 26, 1945  
2 Sheets-Sheet 2

Inventor  
J. I. Vaughn,  
By Neil W. Preston,  
his Attorney

Patented May 2, 1950

2,506,527

UNITED STATES PATENT OFFICE 2,506,527

AUTOMATIC FIELD START CONTROL FOR CODE TYPE COMMUNICATION SYSTEMS

John I. Vaughn, Webster Groves, Mo., assignor to General Railway Signal Company, Rochester, N. Y.

Application May 26, 1945, Serial No. 595,936

8 Claims. (Cl. 246—3)

This invention relates to centralized traffic control or C. T. C. systems for railroads, and more particularly to the automatic field start control for code type communication systems employed in connection with such C. T. C. systems.

In the typical code type communication system for centralized traffic control, to which this invention more particularly relates, code transmitting apparatus at each of the various field stations is employed for transmitting to the control office indications of the position or condition of various devices at the corresponding field location for the information of the operator, such as the position and locked condition of a power operated track switch, the clear or stop indication of signals, and the occupied or unoccupied condition of certain track sections. In the usual organization for systems of this type, when a given field station operates to transmit indications during an operating cycle, a plurality of indications corresponding to the existing position or condition of all of the devices to be indicated, and associated with that field station, are transmitted to the control office by what may be termed a scanning operation. Such scanning of the indicating conditions of the changeable devices at a field station is desirable, because in the normal operation a plurality of changes in the condition of a track switch, signal or associated track circuit often occurs at substantially the same time; and there is a substantial saving in the number of operating cycles required to communicate the proper information to the control office, if the indicating conditions or positions of all devices are communicated during the same operating cycle.

In order that these indications under consideration may be transmitted as soon as there is any new information to be communicated to the control office, it is common practice to provide suitable automatic field start means to condition the coding apparatus at a field station for operation whenever there is a change in the position of a track switch, indications of signals, occupancy of track sections, or the like. When such automatic field start occurs, in response to the change in the condition of any device to be indicated, there are some circumstances or conditions under which no new information of particular importance or interest to the operator is transmitted during certain of the successive indication cycles resulting from such automatic field start control. This is more particularly true in connection with the movement of a train into and out of the detector track section and approach track sections associated with a rack switch.

The primary object or purpose of the present invention is to provide an automatic field start control for code communication systems used in centralized traffic control, so as to eliminate certain operating cycles for transmission of indications during which information of little value to the operator would otherwise be transmitted, and thereby reduce the number of indication cycles and obviate any delay in the transmission of controls or indications as between the control office and the various field stations that might otherwise be caused by such unnecessary indication cycles.

Generally speaking, and without attempting to define the nature and scope of the present invention, it is proposed to provide a special control means for suppressing under certain conditions for a time an automatic field start that would be caused by a change in some device to be indicated, until a subsequent change in some other device has occurred, in such a manner that the appropriate indications of all changed conditions needed to be known by the operator are transmitted, while indications of no immediate interest or importance are postponed until transmitted during some subsequent operating cycle along with other useful information.

Various other objects, characteristic features, attributes and advantages of the invention are more conveniently considered hereinafter in connection with a detail description of one specific embodiment of the invention.

In describing the invention in detail, reference will be made to the accompanying drawings which illustrate in a simplified and diagrammatic manner one specific embodiment of the invention, the parts and circuits being shown more with a view of facilitating an explanation and understanding of the invention than for the purpose of illustrating in detail the construction and arrangement of parts preferably employed in practice.

In these drawings, connections to the opposite terminals of a battery or other suitable source of current are indicated by arrows and the symbols (+) and (—). Also, the contact fingers for each of the various relays are shown in the horizontal position when the relay is energized, and in an inclined position when the relay is deenergized; and the contact fingers for each relay are shown either above or below the representation of its coil or winding with connecting dash lines, as is most convenient in illustrating the circuit connections.

In the accompanying drawings, Fig. 1 shows digrammatically and conveniently one form of the invention applied to the transmission of track occupancy and signal indications in connection with a typical track switch located at the end of a passing siding or the like; and Figs. 2A to 2F show a series of explanatory diagrams illustrating changes in track circuit occupancy occurring during a typical train movement, together with a representation of the condition of the corresponding indicating lamps in the control office, which serve to show the conditions under which automatic field starts occur in accordance with this invention for such a train movement.

The present invention is applicable to any type of code communication system suitable for centralized traffic control systems, and also to various arrangements for providing automatic field starts; but in the interests of simplicity, only one particular embodiment of the invention has been illustrated in connection with an automatic field start control of the type shown and described more in detail in prior patents, such as Judge, No. 2,138,863, December 6, 1938; Judge, et al., No. 2,082,544, June 1, 1937; and Wells, No. 2,159,922, May 23, 1939.

In this type of automatic field start control contemplated, the desired field start is created when a normally energized stick relay CH is deenergized by momentary interruption of its stick circuit. This change relay CH, when thus deenergized, provides the desired conditioning of the field station coding apparatus for operation for an indication cycle by a closure of a back contact 5 in the manner more fully explained in the prior patents above mentioned, the particular way in which the operation of the change relay CH results in the initiation of an indication cycle forming no part of the present invention.

The change relay CH, after being deenergized by a momentary interruption of its stick circuit as later explained, remains deenergized to condition the associated field station apparatus to give an indication cycle; and when such indication cycle actually occurs for the field station in question, this relay CH is restored by a pick-up circuit readily traced in Fig. 1 from (+), through a front contact 6 of a relay LO, energized when the field station in question is operating for an indication cycle, front contact 7 of a step relay V3, closed at the point in the stepping operation just prior to the transmission of indications, and a back contact 8 of a step relay V4 to provide a temporary closure of this pick-up circuit, through winding of relay CH, to (−). After restoration of the change relay CH in this manner, if a change should occur during the transmission of indications, and perhaps after the corresponding indication had been transmitted, the interruption of the stick circuit for the relay CH by such change would establish another field start condition, since the pick-up circuit previously mentioned for this relay CH is only momentarily established during the first part of an operating cycle. This feature is characteristic of the prior field start arrangements such as disclosed in the patents above mentioned, and forms no part of the improvement constituting this invention.

When the field station coding apparatus (shown schematically and enclosed within a dotted rectangle) is thus conditioned for operation by energization of its start circuit by closure of back contact 5 of change relay CH, this coding apparatus operates in the usual manner characteristic of systems of this type to transmit at the appropriate time during an indication operating cycle indications of the then existing condition of all of the various track relays IATR, 2TR, 3ATR, the signal repeater relays IRM and ILM, and other devices to be indicated but not shown, by reason of the fact that contacts associated with these relays govern the energization of indication control circuits shown diagrammatically so as to determine the character of the indication code elements, the specific operation in this respect being dependent upon the particular type of code communication system employed.

Fig. 1 illustrates the invention applied to a typical track layout comprising a single switch SW, assumed to be located at the end of a passing siding of a single track railroad, together with signals IRA, IRB, and ILA and ILB of any suitable type, controlled in accordance with recognized practice, for governing train movement from left to right, and right to left, respectively, over the track switch SW in its normal and reverse positions. The track switch SW is assumed to be connected to and operated by the usual power operated switch machine SM; and the operated position of this switch, together with the indications of the associated signals, is governed by the operator by the transmission of suitable switch and signal control codes from the control office to the particular field station in question during an operating cycle for transmission of controls, in the usual manner characteristic of centralized traffic control systems of the type under consideration.

Associated with the track switch SW is the usual detector track section 2T, having the usual track relay 2TR. Also, it is assumed that the occupancy of two approach track sections IAT and 3AT adjacent the detector track section 2T or opposite sides thereof will also be indicated in the control office. The approach track sections, such as shown in Fig. 1 as IAT and 3AT, when used in connection with approach locking control for a power operated switch, generally include a plurality of track sections to provide approach control limits extending one track section in the rear of an approach or distant signal; but in the interests of simplicity, only one approach track section IAT has been shown for an east-bound train movement toward the switch, and one track section 3AT for a westbound train movement. Each of these track sections IAT and 3AT is provided with the usual track relay IATR and 3ATR.

In the particular arrangement shown, it is assumed that indications of the clear or stop condition of the respective pairs of signals IRA, IRB and ILA, ILB will be transmitted to the control office. The automatic field start for such indications, and the nature of the indication to be transmitted, are determined by relays IRM and ILM repeating the indicating condition of the associated signals IRA, IRB and ILA, ILB. In the simplified arrangement shown, these signals are assumed to be provided with suitable circuit controllers 10 to 13, shown conventionally and acting to close contacts only when the associated signal indicates stop. The signal repeater relay IRM is energized when both of the associated signals IRA and IRB indicate stop by a circuit including the circuit controllers 10 and 11 readily traced on the drawing, and the repeater relay ILM is controlled in a similar way by the signal 2LA and 2LB.

The other devices and circuits for the typical embodiment of the invention illustrated will be considered in describing a typical operation.

As a typical example of the functions and mode of operation of the automatic field start means constituting this invention, assume that an east-bound train is to proceed on the main track shown in Fig. 1. For such a train movement, the operator sends out the appropriate controls to position the track switch SW in the normal position and govern the signal 1RA to indicate clear. The indications associated with the operation of the switch machine, are assumed to be transmitted in the usual manner, and the circuits for doing this have not been shown. When the signal 1RA clears, its repeater relay 1RM is deenergized to shift its contact finger 16 from a front contact to a back contact; and during this movement of this contact finger 16, there is a momentary interruption in the normally energized stick circuit for the change relay CH. This circuit as a whole may be traced from (+), through contact finger 15 of relay 1LM, contact finger 16 of relay 1RM, contact finger 17 of approach track relay 3ATR, contact finger 18 of approach track relay 1ATR, contact finger 19 of the detector track storage relay 2TRS, front contact 20 of relay CH, winding of this relay, to (—).

Thus, when the signal 1RA clears for the train movement under consideration, the change relay CH is deenergized to create a field start and cause transmission of a new signal clear indication to the control office.

Considering now the movement of an east-bound train along the main track, it can be seen that this train will enter and leave successively the track sections 1AT, 2T and 3AT; and when the changes in the condition of the associated track relays are separated by intervals sufficient for an operating cycle to transmit indications, as will likely happen with trains of substantial length running at relatively low speeds, each change in the energized or deenergized condition of each track relay will be followed by an indication cycle, if the usual arrangement of automatic field start control is provided as disclosed in the prior patents above mentioned. These different changes for an east-bound train movement are illustrated in the diagrams of Fig. 2A to Fig. 2F; and by reference to these diagrams it can be seen that these changes involved in sequence entrance of the train into approach track section 1AT, its entrance to the detector track section 2T, its entrance to the other approach track section 3AT, and leaving in turn track sections 1AT, 2T and 3AT. In other words, there are in effect six distinctive conditions of track circuit occupancy during this train movement; and if each of these changes was followed by an indication cycle, there must be six separate indicating cycles for transmission of this information regarding train movement to the operator in the control office.

Certain of these changes in track occupancy, however, are of no particular significance or use to the operator, because such change in train location does not call for or permit a new or different manipulation on the part of the operator, and the progress of the trains into and out of certain track circuits does not afford essential information.

Considering these conditions more in detail, it is desirable to transmit an indication for the information of the operator when the east-bound train under consideration first enters the approach track section 1AT, because this indicates that the train has arrived within the approach locking limits, and no immediate change can, or should be, made in the route set up.

Also, it is desirable to transmit an indication to the control office when the train enters the detector track section 2T, because this advises the operator when it would be permissible to send out controls to change the position of the switch and clear a signal for some other train movement, such as for a west-bound train to come off of the passing siding in connection with a meet.

Figure 2B:
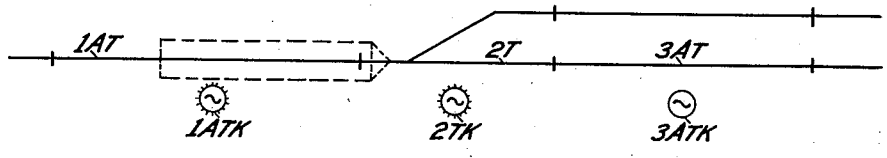
Figure 2C:
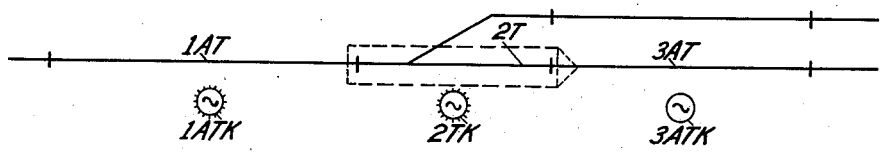

However, when the head end of the east-bound train under consideration has progressed to the point where it enters the next approach track section 3AT, as indicated in Fig. 2C, it is considered that an indication of this change in the track occupancy need not be transmitted for the time being, because the fact that the train has progressed to this point does not permit, or call for, any additional manipulation on the part of the operator. Accordingly, and in accordance with this invention, it is proposed to suppress or postpone the automatic field start occurring under such conditions.

Figure 2D:
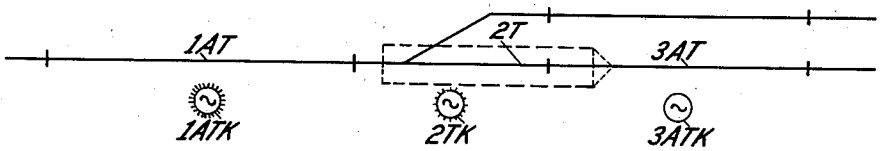

Similarly, when the rear end of the east-bound train under consideration has cleared the approach track section 1AT, as indicated in Fig. 2D, there is no need for transmitting an indication of this condition to the control office, because such information is of no particular significance or interest to the operator.

When the rear end of the east-bound train under consideration has cleared the detector track section 2T, however, it is desirable to transmit an indication of this change to the control office, because this represents a condition where the switch should start its operation and the signal clear, if such control had been exercised and also the condition where such control may be exercised. In other words, the fact that the detector track section 2T has become unoccupied is a matter of significance to the operator, and the automatic field start for such an indication should be provided. The indications showing the then existing unoccupied condition of the approach track section 1AT and the occupied condition of the other approach track section 3ATR will be transmitted on the same indication cycle along with the indication of movement of the train out of the detector track section 2T; and hence the desired information of such occupancy is received in the control office at the appropriate time, even though as above pointed out, such indications were not transmitted when the track section 1AT was first vacated and the track section 3AT was first entered.

Figure 2E:
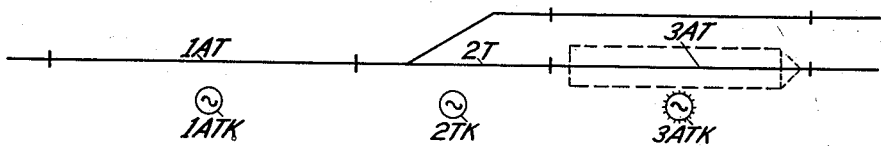
Figure 2F:
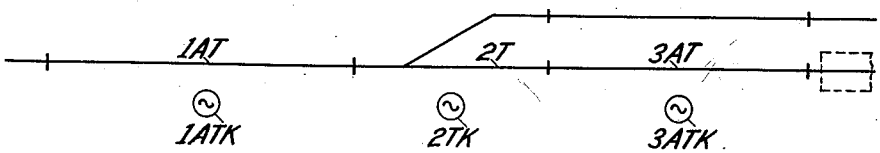

When the train in question leaves the approach track section 3AT, as indicated in Fig. 2F, it is of course desirable to transmit an indication of this fact to the control office, since this represents the progress of the train which is of material interest to the operator.

In the diagrams of Fig. 2A to 2F, indicating lamps 1ATK, 2TK and 3ATK for the respective track sections 1AT, 2T and 3AT have been illustrated, with a diagrammatic representation of when these indicating lamps are extinguished or lighted, in order to represent the indications for the different positions of the train as they appear before the operator on the usual miniature track diagram on his control machine. It should be understood, of course, that the indicating lamps illustrated for explanatory purposes in these Figs. 2A–2F are in the control office, and are not associated with the track over which the train moves.

With this explanation of the desired objectives for an automatic field start control in connection with a typical eastbound train movement, consideration may now be given to the specific arrangement of circuits for governing the change relay CH to attain these objectives.

Referring to Fig. 1, when the train enters the track section 1AT and releases its track relay 1ATR, as indicated in Fig. 2A, the movement of the contact 18 of this relay opens the stick circuit for the change relay CH previously described, and creates the desired automatic field start.

When the train enters the detector track section 2T, as indicated in Fig. 2B, the track relay 2TR is released, and in due time the signal 1RA assumes its stop position and energizes its repeater relay 1RM, thereby establishing a pick-up circuit for the track storage relay 2TRS, which may be readily traced from (+), through front contacts 23 and 24 of relays 1LM and 1RM, back contact 25 of detector track relay 2TR, and winding of relay 2TRS, to (—).

The energization of the track storage relay 2TRS shifts its contact finger 19 from the back contact position to its front contact position, and momentarily interrupts the stick circuit for the change relay CH to provide the desired field start.

The energization of this track storage relay 2TRS is made dependent upon the energized condition of the signal repeating relays 1RM and 1LM, so that if there is any substantial delay in a signal assuming its stop position upon entrance of a train into the detector track section, as in the case of a semaphore signal, the field start caused by the entrance of the train into this detector track section is held up until the signal indicates stop, thereby permitting the indication of the signal at stop to be transmitted on the same operating cycle with the indication of occupancy of the detector track section.

It may be explained at this point that the track storage relay 2TRS is provided and controlled in the manner and for the purpose explained more in detail in the patent to De Long, et al., No. 1,852,402, April 5, 1932. Briefly stated, this track storage relay is employed to assure that an indication of the occupancy of the detector track section will be transmitted to the control office even though this track section may be occupied for a short time by a fast moving short train, and the condition of occupancy may change before the associated field station transmits its indications. It will be noted that the relay 2TRS is maintained energized by a stick circuit through its front contact 27 and a back contact 28 of the relay CH, until the relay CH is restored upon transmission of indications from the corresponding field station. An auxiliary stick circuit including a front contact 29 of a slow-release relay SA, energized during the transmission of an indication cycle, is provided to maintain the relay 2TRS energized during the indication cycle after restoration of the relay CH, so that an indication of occupancy will be transmitted, even though in the meantime the train has left the detector track section and opened the pick-up circuit for the relay 2TRS. This track storage feature forms no part of the particular improvement constituting this invention, and is shown because such a storage relay would ordinarily be used to provide the field start control and shunting action characteristic of this invention, rather than the detector track relay 2TR itself.

Referring to the feature particularly characterizing this invention, the energization of the track storage relay 2TRS closes a front contact 30 to provide a shunt including wire 31 around the contact fingers 18 and 17 of the track relays 1ATR and 3ATR for the two approach track sections 1AT and 3AT. Consequently, while the relay 2TR is maintained deenergized by the presence of a train in the detector track section 2T, the entrance of this train into the approach track section 3AT, as indicated in Fig. 2C, or the movement of this train out of the other approach track section 1AT, as indicated in Fig. 2D, does not cause a field start, since the contacts 18 and 17 of the relays 1ATR and 3ATR are shunted, and do not change the continuity of the stick circuit for the change relay CH upon operation of these approach track relays.

When the track storage relay 2TRS is released by the movement of the train out of the detector track section 2T, as indicated in Fig. 2E, or after the transmission of an occupied indication, as the case may be, the movement of the contact finger 19 of this relay 2TRS interrupts the stick circuit for the change relay CH to create a field start; and indications of the then existing condition of the approach track sections 1AT and 3AT are transmitted on the same operating cycle.

Thus, the indicating lamps 1ATK for the approach track section 1AT, and 2TK for the detector track section 2T, which are lighted on the control panel in the control office with the train in the positions indicated in Figs. 2B, 2C and 2D, are extinguished, and at the same time the indicating lamp 3ATK for the other approach track section 3AT is lighted, much the same as if the train had moved all at once in one step from the position shown in Fig. 2B to the position shown in Fig. 2E.

The release of the track storage relay 2TRS, and the opening of its front contact 30 also breaks the shunt around the contact finger 17 of the track relay 3ATR, so that when the train leaves the track section 3AT, the operation of this contact finger 17 of this relay 3ATR is effective to interrupt the stick circuit for the change relay CH and cause a field start.

A similar sequence of operation is involved for a train movement in the opposite direction; and it can be seen without detail explanation that the entrance of such a west-bound train into the second approach track section 1AT and its movement out of the first track section 3AT are suppressed or postponed until this train has vacated the detector track section 2T. If the eastbound train previously mentioned should enter the passing siding, the sequence of operation is the same as that described, except there is no indication of the movement of such train into and out of the other approach track section 3AT. In the case of a west-bound train coming off of the siding on the main track, the indication of the entrance of this train into the approach track section 1AT is suppressed or postponed in the same manner described, until this train has left the detector track section 2T.

From the foregoing it can be seen that a relatively simple arrangement of circuits in accordance with this invention serves to eliminate the transmission of certain indications in connection with train movement over successive track sections which are not of particular significance for the information of the operator, so as to materially reduce the number of indication cycles that would otherwise be required. It can be appreciated that the same principles and similar circuit arrangements may be employed to suppress or delay unnecessary field starts in connection with other kinds of train movements over other arrangements of track sections; and the invention is in no way limited to the particular arrangement of track sections shown and described, which are merely typical of conditions encountered in practice. Also, the same principles and mode of operation characterizing this invention may be applied to other types of means for creating field starts, with such adaptations or variations in the circuit connections as may be required to carry out the function of suppressing or delaying certain field starts while a predetermined condition exists, such as the occupancy of the detector track section in the particular arrangement disclosed.

The particular embodiment of the invention shown and described is merely typical or illustrative of the nature and character of the invention; and I desire to have it understood that various adaptations, modifications, and additions may be made to the particular organization of parts and circuits illustrated, without departing from the invention.

What I claim is:

1. In a code type communication system for centralized traffic control on railroads, code transmitting apparatus at a field station acting when set in operation by a field start to transmit indications during an operating cycle to a distant control office, two adjacent track sections associated with said field station to have their condition of occupancy indicated in the control office, and means responsive to the entrance of a train into each of said track sections as the train progresses for creating a field start to condition said code sending apparatus for operation, said means also creating a field start when such train leaves the second track section it enters for a given direction of traffic but not when it leaves the other track section.

2. In a code type communication system for centralized traffic control on railroads, the combination with a detector track section for a track switch and an adjacent approach track section each having a track relay, field station coding apparatus acting when set into operation to transmit during an operating cycle indications to a distant control office of the occupied or unoccupied condition of both of said track sections, and automatic field start means governed by said track relays for conditioning said coding apparatus for operation when a train enters said approach track section and said detector track section in turn, and also when such train leaves the detector track section but not when it leaves the approach track section to enter said detector track section.

3. In a code communication system of the character described, the combination with a detector track section for a track switch and two approach track sections one on each side of said detector track section, each of said track sections having a track relay, field station coding apparatus acting when set into operation to transmit to a distant control office indications of the condition of occupancy of all of said track sections, and field start means governed by said track relays for conditioning said coding apparatus for operation when a train enters one of said approach track sections and said detector track section in turn, and also when such train leaves said detector track section, but not when such train leaves the approach track section first entered or enters the other approach track section.

4. In a code communication system for centralized traffic control, a detector track section for a track switch and an adjacent approach track section each having a track relay, field station coding apparatus associated with said track sections acting when set into operation to transmit indications to a distant control office of the condition of occupancy of both track sections, circuit means responsive to the energization or deenergization of the track relay for said approach track section for conditioning said coding apparatus for operation, and circuit means responsive to the energization or deenergization of the detector track relay for conditioning said coding apparatus for operation and also acting while said detector track relay is deenergized to render the track relay for said approach track section ineffective to govern the operation of said coding apparatus.

5. In a system of the character described, the combination with a plurality of adjacent track sections each having a track relay, coding apparatus operable to transmit indications of the condition of occupancy of said track sections, a normally energized circuit acting when broken to condition said coding apparatus for operation, contact means associated with each of said track relays for temporarily interrupting said circuit when that track relay is energized or deenergized, and means effective while said track relay for one of said track sections is deenergized for rendering the contact means associated with the other track section ineffective to control said circuit.

6. In a code type communication system for centralized traffic control on railroads, a detector track section for a track switch and two other adjacent approach track sections one on each side of said detector track section, each of said track sections having a track relay, field station coding apparatus including a field start circuit and conditioned for operation by such circuit to transmit indications to a distant control office of the condition of occupancy of all of said track sections, contact means associated with each of said track relays normally effective to govern said start circuit when that track relay is energized or deenergized, and means effective while the track relay for said detector track section is deenergized for rendering said contact means associated with the other two track sections ineffective to govern said start circuit.

7. In a code communication system of the character described, a detector track section and an adjacent approach track section each having a track relay, coding apparatus operable to transmit indications to a distant control office of the condition of occupancy of both of said track sections during an operating cycle, a normally energized change stick relay acting when deenergized to condition said coding apparatus for operation, a stick circuit for said change relay, contact means associated with each of said track relays and normally effective to interrupt said stick circuit upon energization or deenergization of that track relay, and means effective while the track relay for said detector track section is deenergized for providing a shunt around said contact means associated with said adjacent track section.

8. In a code communication system for transmitting indications from the field stations to a distant control office, a detector track section for a track switch, and an adjacent approach track section each having a track relay, a storage relay energized by the dropping away of said track relay for said detector track section upon the entrance of a train into the detector track section and maintained energized until an occupancy indication has been transmitted, contact means associated with said storage relay and the track relay of said approach track section normally effective to create a field start for transmission of indications when said track relay for the approach track section is energized or deenergized, and means effective while said storage relay is energized for rendering said contact means associated with said track relay for the approach track section ineffective.

JOHN I. VAUGHN.

No references cited.